(12) United States Patent
Turtinen et al.

(10) Patent No.: US 8,830,947 B2
(45) Date of Patent: Sep. 9, 2014

(54) CHANNEL SENSING IN UPLINK TRANSMISSION

(75) Inventors: Samuli Turtinen, Ii (FI); Sami-Jukka Hakola, Kempele (FI); Timo Koskela, Oulu (FI)

(73) Assignee: Broadcom Corporation, Irvine, CA (US)

( * ) Notice: Subject to any disclaimer, the term of this patent is extended or adjusted under 35 U.S.C. 154(b) by 215 days.

(21) Appl. No.: 13/221,298

(22) Filed: Aug. 30, 2011

(65) Prior Publication Data

US 2013/0051358 A1 Feb. 28, 2013

(51) Int. Cl.
*H04W 72/04* (2009.01)
*H04W 72/12* (2009.01)

(52) U.S. Cl.
CPC ...... *H04W 72/0453* (2013.01); *H04W 72/1284* (2013.01); *H04W 72/1278* (2013.01)
USPC .......... 370/330; 370/431; 370/478; 370/329; 455/450; 455/509

(58) Field of Classification Search
CPC ..... H04W 72/00; H04W 72/04; H04W 72/12; H04W 72/0453; H04W 72/0446; H04W 74/0816; H04W 74/0825; H04W 74/085; H04W 74/0858; H04W 76/00
USPC .......... 370/330, 329, 478, 436, 431; 455/422.1, 450, 509
See application file for complete search history.

(56) References Cited

U.S. PATENT DOCUMENTS

| | | | |
|---|---|---|---|
| 2003/0048799 A1* | 3/2003 | Jang | 370/431 |
| 2005/0117536 A1* | 6/2005 | Cho et al. | 370/328 |
| 2007/0021122 A1* | 1/2007 | Lane et al. | 455/441 |
| 2008/0232240 A1* | 9/2008 | Baum et al. | 370/210 |
| 2008/0233958 A1* | 9/2008 | Robbins et al. | 455/436 |
| 2010/0128679 A1* | 5/2010 | Kwon | 370/329 |
| 2010/0220679 A1* | 9/2010 | Abraham et al. | 370/329 |
| 2011/0019645 A1* | 1/2011 | Jeon et al. | 370/331 |
| 2012/0051274 A1* | 3/2012 | Song | 370/311 |
| 2012/0069759 A1* | 3/2012 | Gummadi et al. | 370/252 |
| 2012/0113918 A1* | 5/2012 | Freda et al. | 370/329 |
| 2012/0134328 A1* | 5/2012 | Gauvreau et al. | 370/329 |
| 2012/0225662 A1* | 9/2012 | Jo et al. | 455/447 |
| 2013/0022010 A1* | 1/2013 | Qianxi et al. | 370/329 |
| 2013/0034001 A1* | 2/2013 | Mizusawa et al. | 370/252 |

FOREIGN PATENT DOCUMENTS

| | | |
|---|---|---|
| EP | 2273836 A1 | 1/2011 |
| GB | 2212032 A | 7/1989 |
| WO | WO 00/41543 A2 | 7/2000 |
| WO | WO 2011/050839 A1 | 5/2011 |

OTHER PUBLICATIONS

EP Combined Search and Examination Report under Sections 17 & 18(3) for corresponding GB patent Application 11114888.9 issued on Jan. 12, 2012.

* cited by examiner

*Primary Examiner* — Ian N Moore
*Assistant Examiner* — Phong La
(74) *Attorney, Agent, or Firm* — Stanton IP Law (57) ABSTRACT

A solution for uplink transmission in a cellular communication system is disclosed. The same uplink time-frequency resource are scheduled to at least two terminal devices, and sensing periods of unequal lengths are allocated to the at least two terminal devices. The sensing period defines a duration a terminal device senses the uplink time-frequency resource for a conflicting transmission before transmitting in the uplink time-frequency resource.

9 Claims, 4 Drawing Sheets

CHANNEL SENSING IN UPLINK TRANSMISSION

FIELD

The invention relates to the field of radio communications and, particularly, to using channel sensing for uplink transmission in a radio communication apparatus.

BACKGROUND

In a modern cellular radio communication system, a base station or another element of a network infrastructure schedules uplink and downlink transmission opportunities to terminal devices. With respect to uplink scheduling, typically separate communication resources are scheduled to the terminal devices so as to avoid collisions. Some cellular communication systems employ spatial multiplexing, e.g. multi-user multiple-input-multiple-output (MU-MIMO), to schedule at least two terminal devices to transmit in the same time-frequency resources. The at least two terminal devices may be separated in the space domain by using multiple reception antennas and appropriate signal processing in the base station.

BRIEF DESCRIPTION

According to an aspect of the present invention, there is provided a method comprising: scheduling, by a network element of a cellular communication network, the same uplink time-frequency resource to at least two terminal devices; and allocating sensing periods of unequal lengths to the at least two terminal devices, wherein the sensing period defines a duration a terminal device senses the uplink time-frequency resource for a conflicting transmission before transmitting in the uplink time-frequency resource.

According to another aspect of the present invention, there is provided a method comprising: acquiring, in a terminal device of a cellular communication network, a scheduling message scheduling to the terminal device an uplink transmission in an uplink time-frequency resource; determining a sensing period unique in the scheduled uplink time-frequency resource; and causing the terminal device to sense the scheduled uplink time-frequency resource for a conflicting transmission for the duration of the sensing period before transmitting in the uplink time-frequency resource.

According to another aspect of the present invention, there is provided an apparatus comprising at least one processor; and at least one memory including a computer program code, wherein the at least one memory and the computer program code are configured, with the at least one processor, to cause the apparatus to: schedule the same uplink time-frequency resource to at least two terminal devices of a cellular communication system; and allocate sensing periods of unequal lengths to the at least two terminal devices, wherein the sensing period defines a duration a terminal device senses the uplink time-frequency resource for a conflicting transmission before transmitting in the uplink time-frequency resource.

According to another aspect of the present invention, there is provided an apparatus comprising at least one processor; and at least one memory including a computer program code, wherein the at least one memory and the computer program code are configured, with the at least one processor, to cause the apparatus to: acquire a scheduling message addressed to a terminal device and scheduling to the terminal device an uplink transmission in an uplink time-frequency resource; determine a sensing period unique in the scheduled uplink time-frequency resource; and cause the terminal device to sense the scheduled uplink time-frequency resource for a conflicting transmission for the duration of the sensing period before transmitting in the uplink time-frequency resource.

According to another aspect of the present invention, there is provided an apparatus comprising means for scheduling, by a network element of a cellular communication network, the same uplink time-frequency resource to at least two terminal devices; and means for allocating sensing periods of unequal lengths to the at least two terminal devices, wherein the sensing period defines a duration a terminal device senses the uplink time-frequency resource for a conflicting transmission before transmitting in the uplink time-frequency resource.

According to another aspect of the present invention, there is provided an apparatus comprising: means for acquiring, in a terminal device of a cellular communication network, a scheduling message scheduling to the terminal device an uplink transmission in an uplink time-frequency resource; means for determining a sensing period unique in the scheduled uplink time-frequency resource; and means for causing the terminal device to sense the scheduled uplink time-frequency resource for a conflicting transmission for the duration of the sensing period before transmitting in the uplink time-frequency resource.

According to yet another aspect of the present invention, there is provided a computer program product embodied on a non-transitory distribution medium readable by a computer and comprising program instructions which, when loaded into an apparatus, execute a computer process comprising: scheduling the same uplink time-frequency resource to at least two terminal devices of a cellular communication system; and allocating sensing periods of unequal lengths to the at least two terminal devices, wherein the sensing period defines a duration a terminal device senses the uplink time-frequency resource for a conflicting transmission before transmitting in the uplink time-frequency resource.

According to yet another aspect of the present invention, there is provided a computer program product embodied on a non-transitory distribution medium readable by a computer and comprising program instructions which, when loaded into an apparatus, execute a computer process comprising: acquiring, in a terminal device of a cellular communication network, a scheduling message scheduling to the terminal device an uplink transmission in an uplink time-frequency resource; determining a sensing period unique in the scheduled uplink time-frequency resource; and causing the terminal device to sense the scheduled uplink time-frequency resource for a conflicting transmission for the duration of the sensing period before transmitting in the uplink time-frequency resource.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
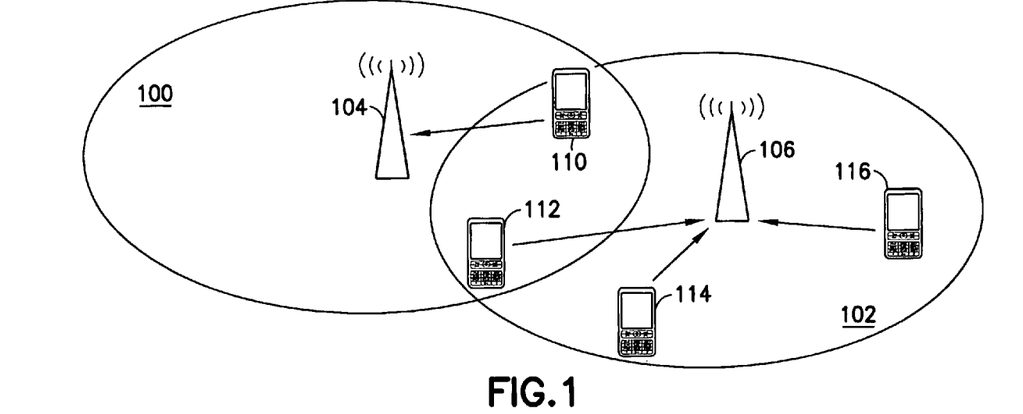
FIG. 1 illustrates a cellular communication scenario to which embodiments of the invention may be applied.

A general communication scenario to which embodiments of the present invention may be applied is illustrated in FIG. 1. Referring to FIG. 1, a scenario where two neighbouring cells 100, 102 served by respective base stations 104, 106 is under consideration. The coverage areas of the cells 100, 102 may overlap at least partly, which is a common scenario in the cellular communication systems. Terminal devices 110 to 116 are located in the coverage areas of the cells 100, 102, and the terminal device 110 is served by the base station 104, while the other terminal devices 112 to 116 are served by the base station 106. Each cell 100, 102 may be any type of a cell used in state-of-the-art cellular communication systems, e.g. a macro cell, a micro cell, a pico cell, or a femto cell. The cell 100, 102 may belong to the fixed network infrastructure designed by network planning by an operator, or the cell 100, 102 may be set up for use in an office or at home, wherein the list of served terminal devices may be predefined and limited to certain terminal devices. The cell 100, 102 may utilize frequency bands licensed to the cellular systems, while in some embodiments the cell 100, 102 may expand its operation frequency band to unlicensed frequencies. Such unlicensed frequencies may include an Industrial, Scientific, Medical (ISM) band and/or television (TV) white spaces. With respect to the TV white spaces, the Federal Communications Commission (FCC) in the United States has issued a report and order (R&O) which permits the use of TV white space spectrum. White space is the term used by the FCC for a TV spectrum which is not being occupied for primary usage e.g. by the TV or wireless microphone transmitters. The cellular communication system comprising the base stations 100, 102 and/or other corresponding network elements may be configured to utilize available frequency bands of such a spectrum having a frequency band on a very high frequency band (VHF, 30 to 300 MHz), ultra-high frequency band (UHF, 300 to 3000 MHz), and/or other frequency bands. The available TV white space frequencies in each area are listed in a database to which the cellular communication system has an access. In addition to the list of free frequency bands, the database may specify transmission power restrictions applicable to each geographical area. The idea is that the condition for using the TV white spaces is that the cellular communication system does not interfere with a primary system, e.g. a television broadcast system.

The cellular communication system may be based on the Universal Mobile Telecommunication System (UMTS) or any one of its evolution versions (e.g. long-term evolution, LTE, or LTE-Advanced), a system based on International Mobile Telecommunication (IMT) standard or any one of its evolution versions (e.g. IMT-Advanced), Worldwide Interoperability for Microwave Access (WiMAX). However, the cellular system is not limited to these examples and it may be any other wireless network within the scope of the present claims.

Figure 2:
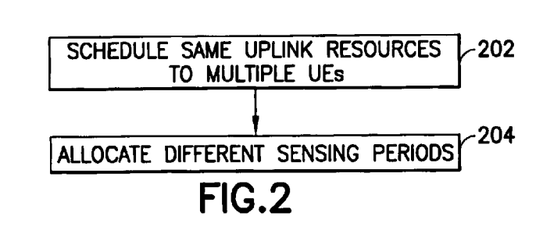
FIGS. 2 and 3 illustrate flow diagrams of processes for channel sensing before an uplink transmission according to embodiments of the invention.
Figure 3:
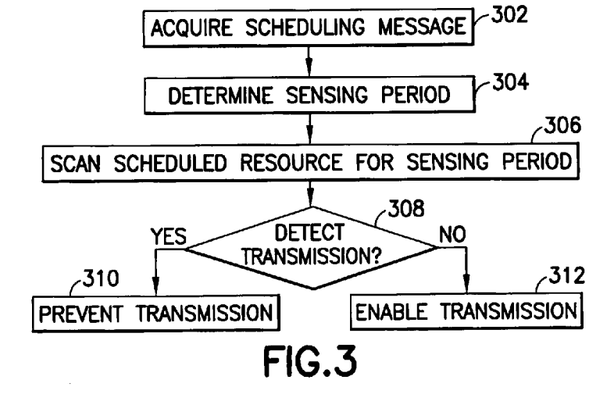

According to an embodiment, the cellular communication system employs a carrier sense multiple access (CSMA) scheme in uplink transmission at least on some frequencies used by the cellular communication system. The CSMA scheme may be defined as a listen-before-talk procedure in which a device senses a radio channel for a conflicting transmission before accessing the radio channel. Upon sensing that the channel is free for a determined duration, the channel access is enabled. Let us now consider some embodiments of the invention for using the CSMA in a system in which the base station 104, 106 or another corresponding network element schedules uplink time-frequency resources to the terminal devices 110 to 116. A time-frequency resource may be understood as a determined number of frequency resource blocks that are scheduled to a given terminal device for a duration of a transmission time interval. The number of frequency resource blocks determines the scheduled bandwidth, while the transmission time interval defines the duration of the scheduling. A transmission time interval may be 1 ms or one sub-frame, for example. FIGS. 2 and 3 illustrate an embodiment from the point of view of the network element (FIG. 2) and the terminal device (FIG. 3).

Referring to FIG. 2, the network element, e.g. the base station 106, schedules in block 202 the same uplink time-frequency resource to at least two terminal devices, e.g. the terminal devices 112, 114. In block 204, the network element allocates sensing periods of unequal lengths to the at least two terminal devices. The sensing period defines a duration a terminal device senses the uplink time-frequency resource for a conflicting transmission before transmitting in the uplink time-frequency resource. Note that the order in which the steps 202, 204 are carried out is reversed in some embodiments. It should be understood that the allocation of the sensing period may precede the scheduling command.

Referring to FIG. 3, a scheduling message is acquired in the terminal device 110 to 116 in block 302. The scheduling message schedules to the terminal device 110 to 116 an uplink transmission in an uplink time-frequency resource. In block 304, a sensing period unique in the scheduled uplink time-frequency resource is determined. It should be understood that no other terminal device is scheduled the same sensing period to the same time-frequency resource.

In block 306, the terminal device 110 to 116 is configured to sense or scan the scheduled uplink time-frequency resource for a conflicting transmission for the duration of the sensing period before transmitting in the uplink time-frequency resource. In an embodiment, if a conflicting transmission is detected during the sensing period (block 308), the uplink transmission in the scheduled time-frequency resource is prevented in block 310. On the other hand, if no conflicting transmissions are detected during the sensing period (block 308), the uplink transmission in the scheduled time-frequency resource is enabled in block 312, and the terminal device 110 to 116 is configured to carry out the uplink transmission.

In the above-described embodiment, the network element schedules the same time-frequency resource to the plurality of terminal devices. Furthermore, the network element allocates sensing periods of different lengths to the plurality of terminal devices. As a consequence, the terminal devices scheduled to the same time-frequency resource are effectively configured to sense the time-frequency resource for a different time period. This results in a situation where a terminal device having a shorter sensing period occupies the time-frequency resource unless it detects a conflicting transmission. If the terminal device detects the conflicting transmission, it does not occupy the time-frequency resource. Then, the other terminal device having a longer sensing period may gain a transmission opportunity, if it does not detect the conflicting transmission. This scheme reduces the waste of time-frequency resources in a case where the terminal device prevents the transmission because of a detected conflicting transmission, although the conflicting transmission would not interfere with the reception in the base station. The reduction is reduced because at least one other terminal device is scheduled to the same time-frequency resource, and the probability of actually using the time-frequency resource increases in proportion to the number of terminal devices scheduled to the time-frequency resource. However, the number of terminal devices scheduled to the same time-frequency resource may be limited to two, three, or four terminal devices in order to reduce the number of unnecessary schedulings.

In an embodiment, the length of the sensing period is linked to an uplink transmission priority of the terminal device. The network element may allocate a shorter sensing period to a terminal device having a high transmission priority, while the network element may allocate a longer sensing period to a terminal device having a lower transmission priority. Accordingly, the length of the sensing period may be proportional to the uplink transmission priority of the terminal device. The transmission priority may refer to a required uplink data throughput, transmission delay, or any other priority classification. In an embodiment, the priority classification is defined in terms of quality of service (QoS) requirements. In another embodiment, the priority classification is defined in terms of user priority, e.g. a higher priority may be assigned to terminal devices related emergency communications while a lower priority may be assigned to a terminal device of a conventional consumer.

In an embodiment, the length of the sensing period is defined as a multiple of uplink symbol duration in the cellular communication system. As the symbol is a unit of uplink transmission, the multiple of one symbol duration may be understood as a limit to the resolution of the sensing period allocation. In an embodiment the length of the sensing period is defined as a multiple of two uplink symbol durations. For example, let us consider a situation where a first terminal device having a shorter sensing period first senses the channel and, thereafter, starts to transmit a first uplink symbol, e.g. a single-carrier frequency division multiple access symbol. During the first symbol duration, a second terminal device scheduled to the same time-frequency resource and sensing the time-frequency resource receives the first symbol. Let us assume that the second terminal device needs some time to process the received signal (the first symbol). As a consequence, when the second terminal device makes the decision of a conflicting transmission, the first terminal device may already be sending the second symbol. Therefore, in order to prevent the second terminal device from being assigned a sensing period that is longer than the sensing period of the first terminal device by a margin that is too small, the sensing periods may be defined as multiples of two, three, or more uplink symbol durations, depending on the processing delays when evaluating the presence of conflicting transmissions.

In an embodiment, the network element is configured to arrange the channel sensing prior to the transmission only on frequency bands not licensed to the cellular telecommunication system. As a consequence, the network element and the terminal device(s) may be configured to apply the sensing periods when a time-frequency resource on the unlicensed spectrum is scheduled to the terminal device(s). The network element and the terminal device(s) may be configured not to apply the sensing periods when a time-frequency resource on the licensed spectrum is scheduled to the terminal device(s). As a consequence, when the scheduled time-frequency resource is on the licensed spectrum, the network element does not allocate the sensing period and the terminal device does not carry out the channel sensing before the uplink transmission. Both schemes may be in use simultaneously when a given base station operates on the licensed spectrum and on an unlicensed spectrum simultaneously, e.g. in a carrier aggregation configuration.

Figure 4:
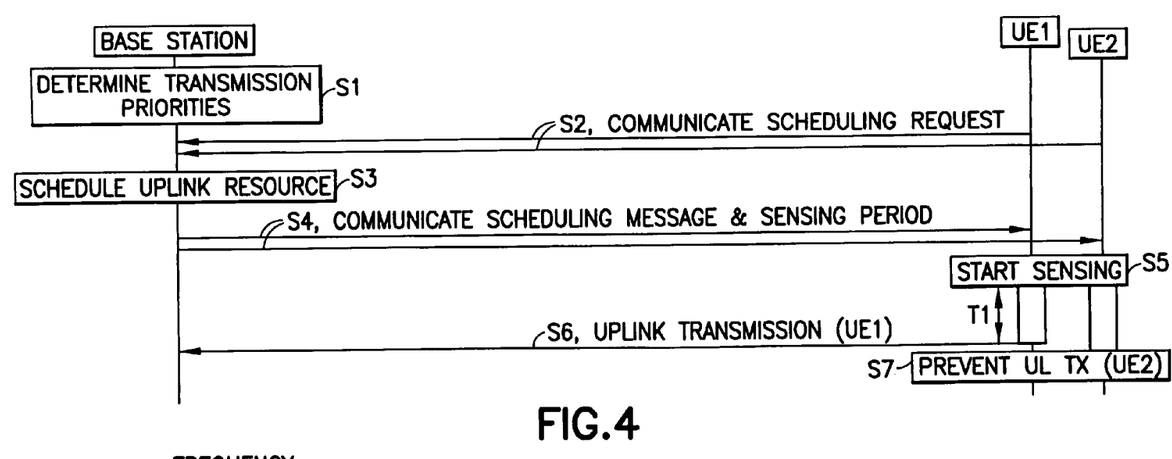
FIG. 4 illustrates a signalling diagram of a procedure for channel sensing before an uplink transmission according to an embodiment of the invention.

Let us now turn to a signalling diagram of FIG. 4 to discuss an embodiment for carrying out the CSMA in the uplink transmissions. FIG. 4 illustrates a signalling diagram where a base station, e.g. base station 106, represents the network element scheduling uplink transmissions of terminal devices (user equipment, UE) UE1 and UE2. Referring to FIG. 4, the base station determines in S1 the transmission priorities of the terminal devices UE1 and UE2. The base station may determine different transmission priorities for the terminal devices UE1, UE2 and, as a consequence, different lengths of the sensing periods will be configured to the terminal devices UE1, UE2. The allocation of the sensing periods may also be carried out in S1. In S2, each terminal device UE1, UE2 transmits an uplink scheduling request requesting the base station to schedule an uplink transmission resource to the terminal devices UE1, UE2. In S3, the base station schedules the same time-frequency resource to the terminal devices UE1, UE2. S3 may comprise selecting the uplink time-frequency resource for the terminal devices UE1, UE2. In S4, the base station is configured to transmit a scheduling message to the terminal device, wherein the scheduling message may carry a scheduling assignment specifying the uplink time-frequency resource scheduled to the terminal devices UE1, UE2. The scheduling message may be transmitted on a physical downlink control channel (PDCCH). In an embodiment, the base station is configured to include a sensing period assignment in the PDCCH and to transmit the sensing period assignment in connection with the scheduling message. The scheduling assignment and the sensing period assignment may both be transmitted in the same frame on the PDCCH. The sensing period assignment may be comprised in a downlink control information (DCI) message on the PDCCH, e.g. DCI format 0 (zero) message. In an embodiment, a new field is defined in the DCI format 0 message to carry the sensing period assignment. Upon reception of the scheduling message and the sensing period assignment, the terminal devices UE1, UE2 prepare for the uplink transmission in the scheduled time-frequency resource. Before the uplink transmission, the terminal devices UE1, UE2 tune their respective receivers to scan the scheduled frequency resource from the beginning of the scheduled transmission time interval (S5). In this example, UE1 is determined in S1 to have a higher uplink transmission priority than the uplink transmission priority of UE2 and, accordingly, UE1 has a shorter sensing period than the sensing period of UE2. UE1 senses the time-frequency resource for the duration of the sensing period of UE1 (denoted by T1 in FIG. 4). Upon detection of no conflicting transmissions in the time-frequency resource, e.g. no radio energy or no signal is detected or only energy/signal below a determined threshold is detected, UE1 carries out uplink transmission of an uplink message in S6. The uplink message may be any message, e.g. a control message and/or data. The uplink message may comprise in identifier of the terminal device UE1 in order to enable the base station receiving the uplink transmission to identify which one of the terminal devices UE1, UE2 carried out the uplink transmission. In an embodiment, the identifier is comprised in a Medium Access Control (MAC) header of the uplink message. The base station may then process the identifier contained in the uplink message, identify the transmitter that transmitted the uplink message in the time-frequency resource, and extract the contents of the uplink message (S6).

Upon detection of the uplink transmission of UE1, the other terminal device UE2 prevents its uplink transmission in the time-frequency resource scheduled in S4. The detection may be based on a result of a signal detection procedure carried out in the time-frequency resource. The signal detection procedure may be based on sensing the presence/absence of radio energy in the time-frequency resource, but it should be appreciated that any other signal detection procedure may be utilized. There may be a short processing delay between the start of the uplink transmission and the start of S7, as shown in FIG. 4.

Figure 5:
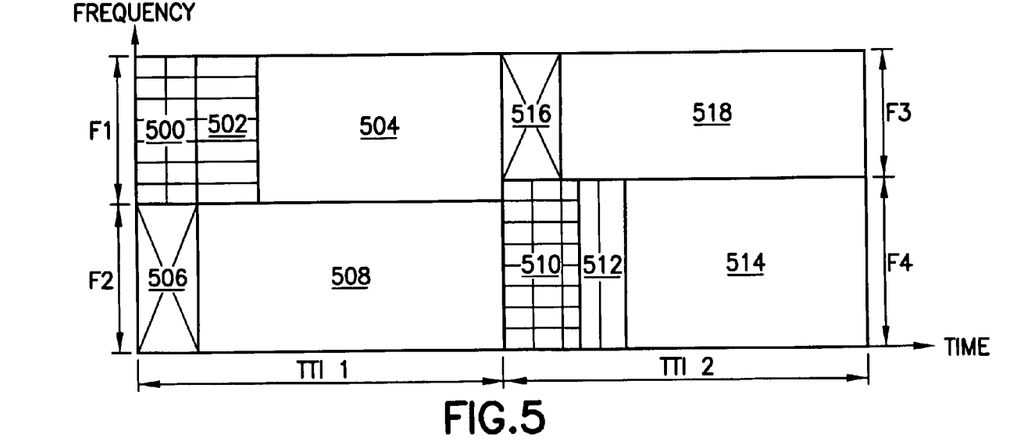
FIG. 5 illustrates scheduling in combined with channel sensing according to an embodiment of the invention.

In the embodiment of FIG. 4, the sensing period is allocated on a physical layer which enables dynamic reallocation of the sensing period. As a consequence, the base station may rapidly adjust the sensing periods of the terminal devices so as to carry out fair sharing of uplink resources. This prevents a lower priority terminal device from starving caused by losing all the uplink transmission opportunities. FIG. 5 illustrates a time-frequency diagram of an embodiment where the base station allocates the time-frequency resources and associated sensing periods to terminal devices in a dynamic manner. This means that and the sensing period may be changed between any consecutive scheduled time-frequency resource, e.g. between consecutive transmission time intervals (TTI). Referring to FIG. 5, a first time frequency resource represented by F1 and TTI1 is scheduled to a first terminal device and a second terminal device. The base station assigns to the first terminal device a sensing period of length denoted by reference number 500 in FIG. 5 (see vertical lining). The base station assigns to the second terminal device a sensing period of length denoted by reference number 502 in FIG. 5 (see horizontal lining). As the first terminal device has a shorter sensing period, is has a priority to carry out the uplink transmission during a time interval denoted by 504. Note that in case the first terminal device gains the channel access, the uplink transmission 504 begins from the end of the sensing period 500 of the first terminal device. If the first terminal device does not gain the channel access, the uplink transmission starts after the sensing period 502 of the second terminal device. The base station schedules a time-frequency block denoted by TTI 1 and F2 and associated sensing period 506 to a third terminal device and, upon detection of no conflicting transmissions during the sensing period 506, the third terminal device carries out the uplink transmission 508.

With respect to the subsequent transmission time interval TTI2, the base station may again schedule the third terminal device to an exclusive time-frequency resource F3, TTI2 with the sensing period 516 and an associated uplink data transmission period 518. The sensing period 516 may be different from the previous sensing period 506. With respect to the other time-frequency resource F4, TTI2, the base station may again schedule the first and second terminal device to the same time-frequency resource. However, the base station may now change the uplink transmission priorities of the terminal devices (S1 in FIG. 4) such that the second terminal device now has a higher transmission priority and shorter sensing period 510. The first terminal device then has a longer sensing period 512. This gives the priority for the channel access to the second terminal device and, therefore, it has a higher probability of carrying out the uplink transmission in 514. This type of dynamic changing enables the base station to control the uplink throughput of the terminal devices as well. For example, if the QoS requirements of the first terminal device are higher than the QoS requirements of the second terminal device, the base station may allocate a higher number of shorter sensing intervals to the first terminal device and a higher number of longer sensing intervals to the second terminal device, e.g. two out of three times the first terminal device has a shorter sensing interval and one out of three times the second terminal device has a shorter sensing interval.

It should be noted that the scheduling arrangement of FIG. 5 is merely exemplary, and there may be a higher number of frequency resources with different numbers of frequency resource blocks and different sensing periods. The sizes of the scheduled frequency blocks and the sensing periods may vary between the transmission time intervals, as deemed necessary by the network element.

Figure 6:
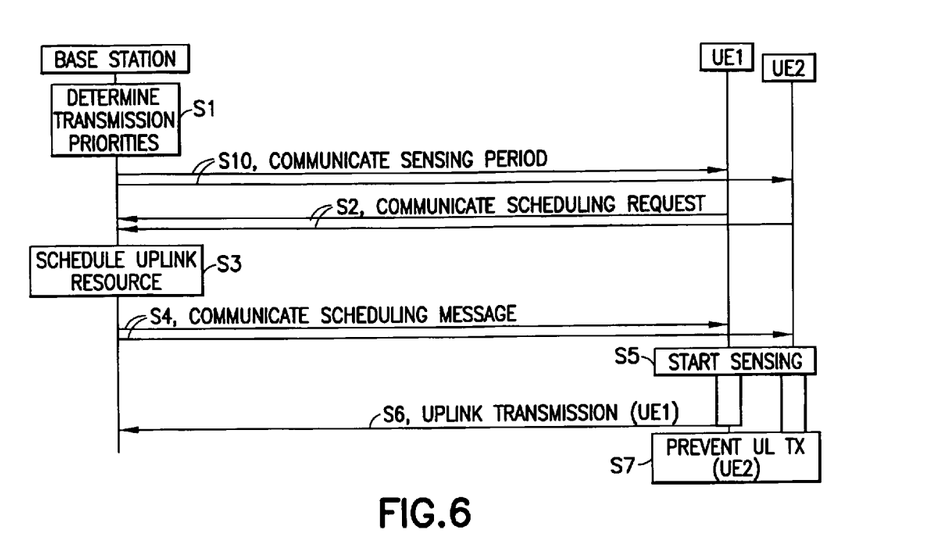
FIG. 6 illustrates a signalling diagram of a procedure for channel sensing before an uplink transmission according to another embodiment of the invention.

In the embodiments of FIGS. 4 and 5, the sensing interval was allocated in connection with the scheduling assignment by using physical layer signalling which enables dynamic and fast adaptation of the sensing periods. Let us now consider some further embodiments for signalling the sensing period. In an embodiment, the base station is configured to broadcast mapping information between the uplink transmission priorities and associated sensing periods, and the PDCCH or another control channel carrying out the sensing period assignment may carry an information field containing the uplink transmission priority of a given terminal device. The terminal device may then use the broadcasted mapping information so as to derive the sensing period from the uplink transmission priority information included in the sensing period assignment. In another embodiment, the base station is configured to assign the sensing period through broadcast signalling, and the terminal device is configured to derive the sensing period from a broadcast message received from the base station. In another embodiment, the base station or another network element is configured to assign the sensing period by using a higher level signalling, e.g. radio resource control (RRC) signalling. As a consequence, the sensing period may be seen as a semi-static parameter. FIG. 6 illustrates a signalling diagram encompassing the above-mentioned embodiments for signalling the sensing period as separated from the scheduling assignment. The steps denoted by the same reference signs as in FIG. 4 represent similar operations.

In S1, the base station determines the transmission priorities of the terminal devices UE1 and UE2 and selects the sensing periods of the terminal devices UE1, UE2 accordingly. In S10, the base station is configured to transmit a message pertaining to the sensing periods. In an embodiment, the base station configures the terminal devices UE1, UE2 to apply the selected sensing periods through the RRC signalling, and the message communicated from the base station to the terminal devices in S10 is an RRC message. In another embodiment, the base station configures the terminal devices UE1, UE2 to apply the selected sensing periods through the broadcast signalling, and the message communicated from the base station to the terminal devices in S10 is a broadcast message. In yet another embodiment, the base station transmits in S10 a broadcast message comprising the above-mentioned mapping information. Thereafter, the terminal devices communicate the scheduling request in S2, the base station schedules the uplink time-frequency resources in S3 and S4, and so on in the above-described manner (FIG. 4).

In an embodiment, the terminal devices scheduled to use the same time-frequency resource are configure to use at least some of the same uplink transmission parameters. For example, the terminal devices may be configured to use the same uplink demodulation reference signal (DM RS) sequence. The DM RS sequence is transmitted within the uplink transmission and it enables the base station to demodulate the received uplink message. The DM RS sequence and/or associated properties, e.g. a cyclic shift of a base DM RS sequence, may be derived from the scheduling assignment, e.g. from a resource index specifying the scheduled time-frequency resource and contained in the scheduling assignment.

With respect to determining the terminal devices that are to be scheduled to the same time-frequency resource, let us consider some embodiments of a procedure for the base station or another network element to group the terminal devices. In an embodiment, the above-described embodiments for scheduling at least two terminal device to the same time-frequency resource is applied to cells having a coverage area so small that it is probable that all the terminal devices in the cell are able to sense the transmissions of any other terminal device in the cell. Such a cell may be a picocell or a femtocell, for example. In such embodiments, the network element may be configured to group any two or more terminal devices into the same group and to schedule the same time-frequency resource to the terminal devices in the same group. In a cell having a large coverage area such that terminal devices on opposite edges of the cell cannot detect one another, the network element may use a more sophisticated method for grouping the terminal devices. One criterion for adding at least one other terminal device to the group of a given terminal device is when the network element detects that the number of cancelled uplink transmission of the terminal device exceeds a determined threshold. This means that the uplink transmission opportunity of the terminal device is constantly prevented by a conflicting transmission. As a consequence, the time-frequency resource is constantly wasted. Therefore, the network element may add at least one other terminal device to the same group so as to improve the spectrum use. In another embodiment, the network detects increased interference on a given frequency band. The network element may then assign a plurality of terminal devices to the interfered frequency band, if the network element estimates that the interference is still within tolerable limits such that the base station has a chance of decoding an uplink transmission transmitted in the interference frequency resource. Thereby, the probability of at least one terminal device transmitting in the interfered time-frequency resource is increased. The network element may naturally also consider the interference of the uplink transmission towards the source of the interference on the interfered frequency band. For example, if the interference source is a primary system, e.g. a television broadcast system, the network element may choose to avoid that frequency band.

With respect to the grouping, the network element may determine the terminal devices to be grouped on the basis of their locations. In an embodiment, the network element is arranged to receive an estimate of the location of the terminal device in the cell. The location of the terminal devices may be derived by estimating the location of the terminal devices by using path loss estimation and/or multi-antenna reception with spatial signal processing. In another embodiment, a positioning system such as GPS (Global Positioning System) is used, and the terminal devices may periodically report their locations. In yet another embodiment, the terminal device may be configured, e.g. by the network element, to scan for uplink transmissions and to derive identities of neighbouring terminal devices from the detected uplink transmissions. The terminal devices may then be configured to report the identities of the detected terminal devices to the network element. As a consequence, the network element gains knowledge which neighbouring terminal devices are detected by each terminal device. Then, the network element may assign at least some of the terminal devices that are able to detect each other into the same group so as to prevent conflicting uplink transmissions by terminal devices that cannot detect each other.

Referring to FIG. 1, the terminal device 110 may constantly interfere uplink transmissions of the terminal device 112 and, therefore, the base station 106 may choose to add another terminal device to the same group with the terminal device 112. The terminal device 116 on the other edge of the cell 102 may not be a potential candidate because of a high distance between the terminal devices 112, 116. It may happen that both terminal devices would send an uplink message if they cannot detect each other's transmissions, thus resulting in a conflict. On the other hand, a terminal device 114 close to the terminal device 112 may prove to be a potential candidate for the grouping. Naturally, in some cells there may be a direct line-of-sight between the terminal devices 112, 116 and a concrete wall or another block between the terminal devices 112, 114. Therefore, the base station 106 may configure the terminal devices 112 to 116 to scan for the uplink transmissions of the other terminal devices and to report the identities of the detected terminal devices.

Figure 7:
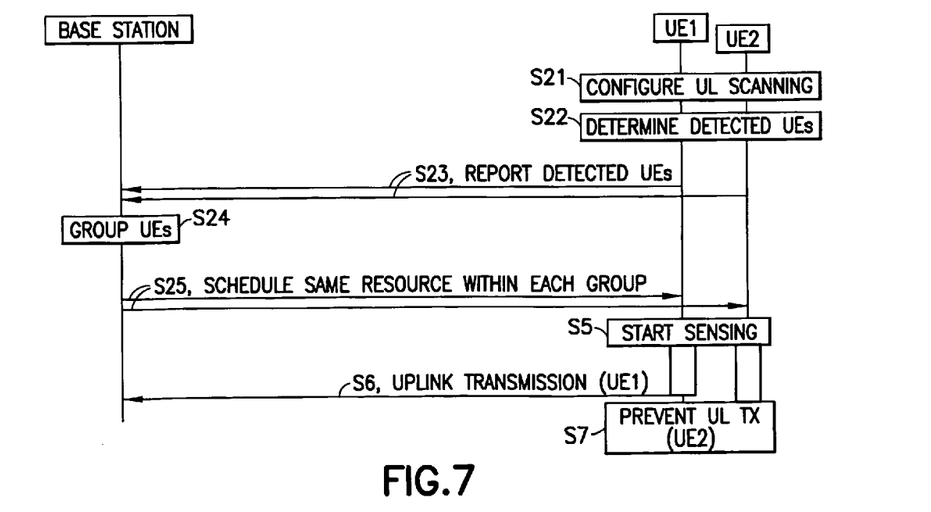
FIG. 7 illustrates an embodiment for grouping terminal devices according to an embodiment of the invention.

Let us now consider an embodiment for carrying out the grouping. FIG. 7 illustrates a signalling diagram of such an embodiment. FIG. 78 may be seen as a modification of any one of the embodiments described above in connection with FIG. 4 and FIG. 6. Referring to FIG. 7, the terminal devices UE1, UE2 are configured to carry out scanning for uplink transmissions by other terminal devices in S21. S21 may be triggered by a command received from the base station, or the terminal devices UE1, UE2 may be configured to carry out the scanning periodically without an explicit command from the network. The terminal devices may be configured to monitor for physical uplink control channel (PUCCH), physical uplink shared channel (PUSCH), and/or physical random access channel (PRACH) transmissions of the other terminal devices, or any other transmissions that comprise an identifier of a transmitting terminal device. This enables the terminal devices UE1, UE2 to determine the identities of the detected terminal devices (S22). In S23, the terminal devices UE1, UE2 report the identities of the detected terminal devices to the base station. The report may be transmitted through the uplink RRC signalling, for example. In S24, the base station groups the terminal devices on the basis of the report received from the terminal devices. For example, let us assume that the terminal devices UE1, UE2 both report that they detected each other. Then, the base station may be configured to group the terminal devices UE1, UE2 to the same group, provided that the base station has deemed the grouping to be feasible in general. In S25, the base station schedules the same time-frequency resource to the terminal devices in the same group. Note that the base station may have formed a plurality of groups, and it may apply the same rules to each group, e.g. schedule the same time-frequency resource to every terminal device included in the same group. Then, blocks S5 to S7 are carried out in the above-described manner.

Figure 8:
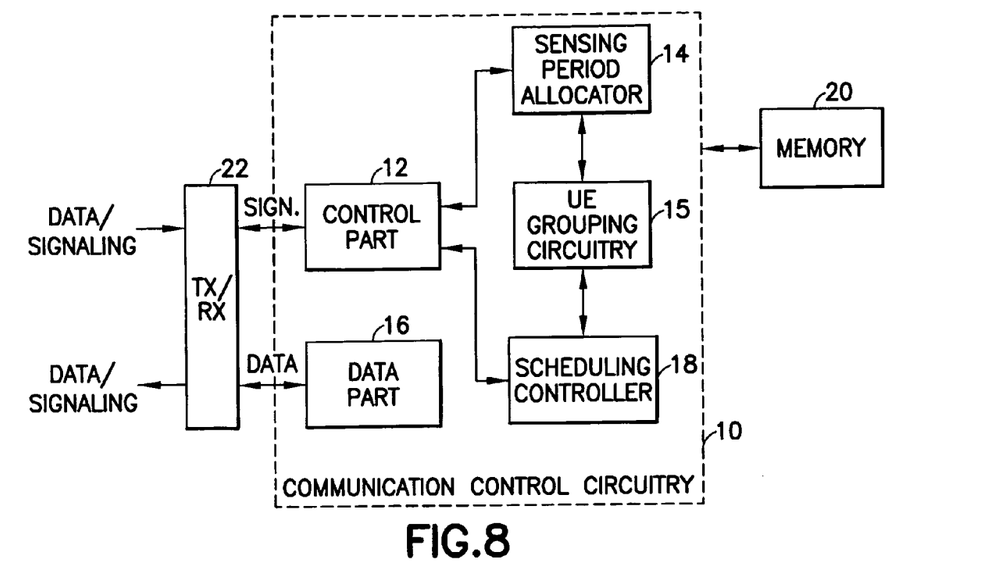
FIGS. 8 and 9 illustrate block diagrams of apparatuses according to embodiments of the invention.

FIG. 8 illustrates an embodiment of an apparatus comprising means for carrying out the above-mentioned functionalities of the network element. The apparatus may be a communication apparatus of a cellular telecommunication system, e.g. an enhanced NodeB of the UMTS LTE-Advanced or another wireless network. The apparatus may be a fixed or a mobile base station operating as an access point for a plurality of terminal devices, or another apparatus in the cellular radio access network. In another embodiment, the apparatus is comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 10 may comprise a control part 12 handling control signalling communication with respect to transmission, reception, and extraction of control frames including the scheduling assignment messages, the sensing period assignment messages, and any other control messages or control frames, as described above. The communication controller circuitry 10 may further comprise a data part 16 that handles transmission and reception of payload data during transmission time intervals of the communication apparatus (transmission) or transmission opportunities of the terminal devices (reception). The communication controller circuitry 10 may further comprise a scheduling controller circuitry 18 configured to schedule uplink and, optionally, downlink time-frequency resources to the terminal devices. The scheduling controller circuitry 18 may be configured to schedule at least two terminal devices to the same time-frequency resource according to a determined criterion. The information on the terminal devices to which the same time-frequency resource should be scheduled may be received from a terminal device grouping circuitry 15 configured to group the terminal devices in the above-described manner. The terminal device grouping circuitry 15 may also send information on the grouping to a sensing period allocator circuitry 14 configured to determine the sensing periods for the terminal devices. Upon receiving information on the grouping from the terminal device grouping circuitry 15, the sensing period allocator circuitry 14 may ensure that no two terminal devices assigned to the same group are assigned with the same sensing period. The scheduling controller circuitry 18 may then instruct the control part 12 to transmit the scheduling assignments to the terminal devices, and the sensing period allocator circuitry 14 may instruct the control part 12 to transmit the information on the allocated sensing periods by using appropriate downlink control signalling method.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the communication apparatus. The memory 20 may also store communication parameters and other information needed for the wireless communications, e.g. rules for carrying out the grouping and/or currently applicable sensing periods. The apparatus may further comprise radio interface components 22 providing the apparatus with radio communication capabilities with the terminal devices and, optionally, with other network elements of the radio access network, e.g. with other base stations over a wireless X2 interface. The radio interface components 22 may comprise standard well-known components such as amplifier, filter, frequency-converter, (de)modulator, and encoder/decoder circuitries and one or more antennas. The base station may further comprise a communication connection with a core network of the cellular communication system and/or with other network elements of the radio access network.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to scheduling the time-frequency resources and/or allocating the sensing periods, as described above in connection with FIGS. 4 to 7. Accordingly, the at least one processor, the memory, and the computer program code form processing means for carrying out embodiments of the present invention in the wireless communication apparatus.

Figure 9:
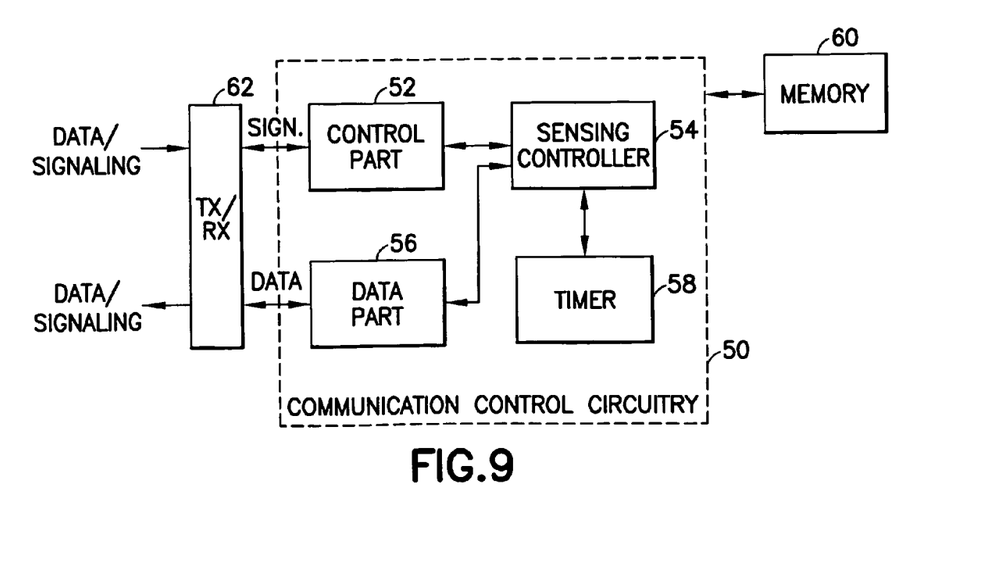

FIG. 9 illustrates an embodiment of an apparatus comprising means for carrying out the above-mentioned functionalities of the terminal device. The apparatus may be a communication apparatus of the cellular telecommunication system, e.g. UE of the UMTS LTE-Advanced. The apparatus may be a computer (PC), a laptop, a tabloid computer, a cellular phone, a palm computer, or any other apparatus provided with radio communication capability and operating as the above-mentioned terminal device. In another embodiment, the apparatus is comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 50 may comprise a control part 52 handling control signalling communication with respect to reception and extraction of control frames including the scheduling assignments, the sensing period assignments, and any other control messages or control frames, as described above. The control part 52 may also handle transmission of control messages related to the reports about the detected neighbouring terminal devices. The communication controller circuitry 50 may further comprise a data part 56 that handles transmission and reception of payload data during uplink transmission opportunities of the communication apparatus (transmission) or reception of downlink data. The communication controller circuitry 50 may further comprise a sensing controller circuitry 54 configured to receive from the control part a scheduled time-frequency resource and an assigned sensing period. At the beginning of the scheduled time-frequency resource, the sensing controller circuitry 54 is configured to start a timer 58 counting the assigned sensing period and to configure the control part 52 to start scanning the time-frequency resource for a conflicting transmission. The control part 52 may then measure radio energy or attempt to detect a signal in the time-frequency resource. Upon detecting no conflicting transmissions in the time-frequency resource within the sensing period, the sensing controller circuitry 54 may trigger the data part 56 to start the uplink transmission in the remaining time-frequency resource. However, upon receiving from the control part a notification about the presence of a conflicting transmission, the sensing controller circuitry 54 may cancel the uplink transmission.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) configuring the apparatus to perform the above-described functionalities of the communication apparatus. The memory 60 may also store communication parameters and other information needed for the wireless communications, e.g. communication parameters of the terminal device. The apparatus may further comprise radio interface components 62 providing the apparatus with radio communication capabilities with the base station and other network elements. The radio interface components 62 may comprise standard well-known components such as amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 3. In further embodiments, the at least one memory and the computer program code are configured, with the at least one processor, to cause the apparatus to carry out any one of the embodiments related to the terminal device, as described above in connection with FIGS. 3 to 7. Accordingly, the at least one processor, the memory, and the computer program code form processing means for carrying out embodiments of the present invention in the communication apparatus.

As used in this application, the term 'circuitry' refers to all of the following: (a) hardware-only circuit implementations, such as implementations in only analog and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, software distribution package, and any article of manufacture capable of storing such a computer program, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   determining transmission priorities from scheduling requests received from at least two terminal devices at a network element of a cellular communication network;
   scheduling, by the network element, a same uplink time-frequency resource to the at least two terminal devices; and
   allocating, by the network element, based on the determined transmission priorities, sensing periods of unequal lengths to the at least two terminal devices such that a shorter sensing period is allocated to the respective terminal device having a higher of the transmission priorities and a longer sensing period is allocated to the respective terminal device having a lower of the transmission priorities,
   wherein the respective sensing periods define a time during which the respective terminal device senses the uplink time-frequency resource for a conflicting transmission before transmitting in the uplink time-frequency resource, and the lengths of the sensing periods are multiples of an uplink symbol duration.

2. The method of claim 1, further comprising allocating the same uplink reference signal sequence to the at least two terminal devices scheduled to the same uplink time-frequency resource.

3. The method of claim 1, further comprising:
   allocating the sensing period dynamically together with a scheduling message delivering an indication of the scheduled uplink time-frequency resource to the terminal device.

4. The method of claim 1, further comprising: allocating the sensing periods only to terminal devices operating on an unlicensed frequency band.

5. An apparatus comprising:
   at least one processor; and
   at least one memory including a computer program code,
   wherein the at least one memory and the computer program code of a network element of a cellular communication network are configured, with the at least one processor, to cause the apparatus to:

determine transmission priorities from scheduling requests received from at least two terminal devices at the network element;

schedule a same uplink time-frequency resource to the at least two terminal devices; and allocate, based on the transmission priorities, sensing periods of unequal lengths to the at least two terminal devices such that a shorter sensing period is allocated to the respective terminal device having a higher of the transmission priorities and a longer sensing period is allocated to the respective terminal device having a lower of the transmission priorities, wherein the respective sensing periods define a time during which the respective terminal device senses the uplink time-frequency resource for a conflicting transmission before transmitting in the uplink time-frequency resource, and the lengths of the sensing periods are multiples of an uplink symbol duration.

6. The apparatus of claim 5, wherein the at least one memory and the computer program code are configured, with the at least one processor, to cause the apparatus to allocate the same uplink reference signal sequence to the at least two terminal devices scheduled to the same uplink time-frequency resource.

7. The apparatus of claim 5, wherein the at least one memory and the computer program code are configured, with the at least one processor, to cause the apparatus to allocate the sensing period dynamically together with a scheduling message delivering an indication of the scheduled uplink time-frequency resource to the terminal device.

8. The apparatus of claim 5, wherein the at least one memory and the computer program code are configured, with the at least one processor, to cause the apparatus to allocate the sensing periods only to terminal devices operating on an unlicensed frequency band.

9. A computer program product embodied on a non-transitory distribution medium readable by a computer and comprising program instructions which, when loaded into an apparatus, execute a computer process comprising:

determining transmission priorities from scheduling requests received from at least two terminal devices at a network element of a cellular communication network;

scheduling, by the network element, a same uplink time-frequency resource to the at least two terminal devices of a cellular communication system; and allocating, by the network element, based on the determined transmission priorities, sensing periods of unequal lengths to the at least two terminal devices such that a shorter sensing period is allocated to the respective terminal device having a higher of the transmission priorities and a longer sensing period is allocated to the respective terminal device having a lower of the transmission priorities, wherein the respective sensing periods define a time during which the respective terminal device senses the uplink time-frequency resource for a conflicting transmission before transmitting in the uplink time-frequency resource, and the lengths of the sensing periods are multiples of an uplink symbol duration.

* * * * *